(No Model.)
J. G. CHERRY.
PORTABLE CASE FOR TRANSPORTING CREAM.
No. 251,831. Patented Jan. 3, 1882.
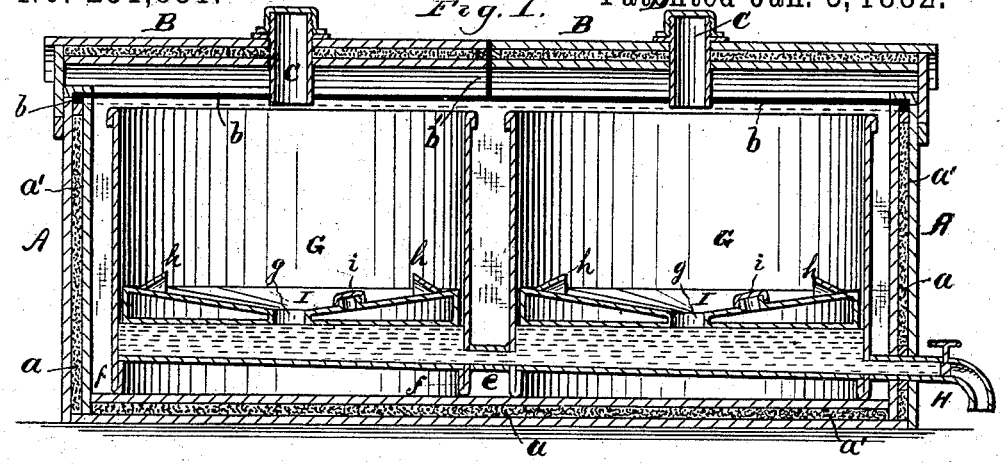
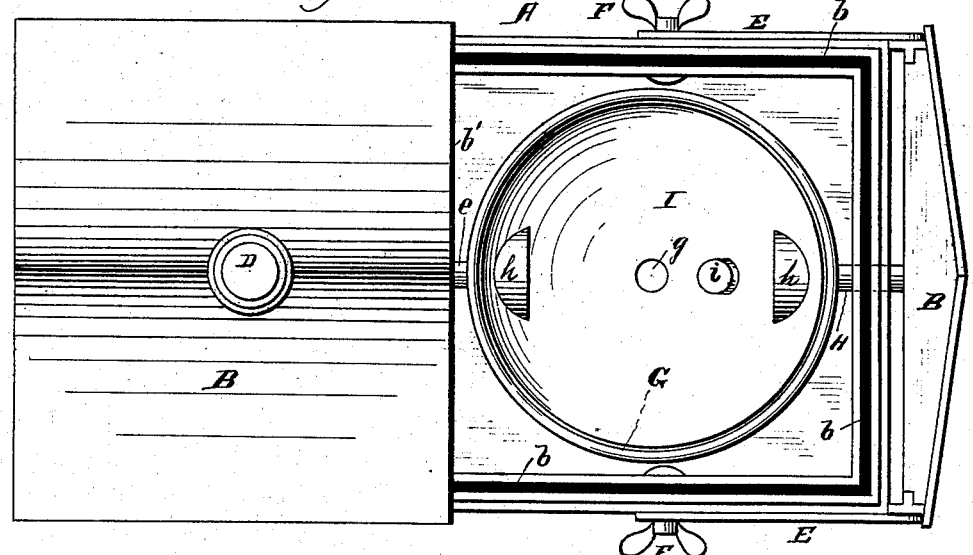
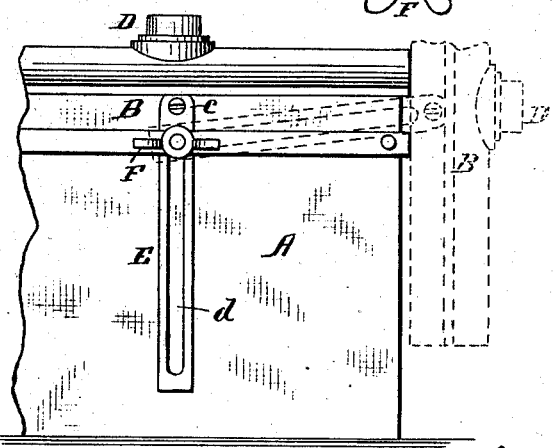
Witnesses.
Henry Frankfurter,
T. F. Morse
Inventor.
John G. Cherry.
per. Gridley & Co.
his Attorneys.

UNITED STATES PATENT OFFICE.

JOHN G. CHERRY, OF CEDAR RAPIDS, IOWA.

PORTABLE CASE FOR TRANSPORTING CREAM.

SPECIFICATION forming part of Letters Patent No. 251,831, dated January 3, 1882.

Application filed October 10, 1881. (No model.)

*To all whom it may concern:*

Be it known that I, JOHN G. CHERRY, of Cedar Rapids, in the county of Linn and State of Iowa, have invented certain new and useful Improvements in Portable Cases for Transporting Cream; and I do hereby declare that the following is a full, clear, and exact description thereof, which will enable others skilled in the art to which my invention appertains to make and use the same, reference being had to the accompanying drawings, and letters of reference marked thereon, which form a part of this specification.

Cream, as is well known, is produced in comparatively small quantities at any one dairy, and is collected from a number of neighboring dairies or farms by collectors, who make a circuit of certain districts for that purpose in order to supply the demands of those who consume comparatively large quantities in the manufacture of butter and cheese, or otherwise. Experience has shown that the cream thus collected, while being conveyed from place to place in the vessels heretofore employed for that purpose, has been liable to injury both by heat in summer and by cold in winter. I have aimed, therefore, to provide for the purpose referred to a vessel in which the cream will be protected from the effects of such degrees of temperature as would be liable to injure it; and my invention consists in the means substantially as hereinafter specified, which I purpose to employ for the purpose set forth.

It also consists in certain details of construction, all of which will hereinafter be fully explained.

In the drawings, Figure 1 is a vertical central longitudinal section of a portable cream-receiver embodying my invention. Fig. 2 is a top view thereof, showing the same partly open; and Fig. 3 is a side elevation, showing particularly the means employed for connecting the covers to the body of the vessel.

Like letters of reference indicate like parts.

A represents an outer box or case, which, with the exceptions hereinafter referred to, I make as nearly air-tight as may be done without using expensive material and necessitating too much nicety of construction. Well-seasoned hard wood, or even soft wood, rendered impervious to the action of the weather, may be used in constructing the case A; but as it may be made of any suitable substance, and as my invention, so far, at least, as relates to the outer case, has particular reference to certain modes of construction, independently of the material employed, I do not here intend to restrict myself to any particular material, although I regard wood as preferable, on account of its cheapness, lightness, and durability, and for the reason that it may be worked up with facility. The floor and vertical walls of the case A, I make double, as shown, leaving between the outer and inner parts a space, $a$, which I fill with either sawdust, paper, felt, or other suitable material, (represented at $a'$,) which will aid in keeping the interior of the box at a uniform or nearly-uniform temperature, although the outer temperature may vary, or which, in other words, will tend to prevent a change in the outer temperature from being unduly felt within the case. For example, cream contained in such a box will, as is now obvious, be greatly protected while in transit both from the bad effects of cold during winter, and from the injurious effects of heat during summer—results which it is chiefly my purpose to accomplish.

B B are the lids or covers of the box or case A. I also construct these lids to receive a filling such as and for the purpose already described and set forth in my explanations of the case. In order to shut out the external air as much as possible from the case while the lids are closed, I arrange around the upper edge of the case a packing, $b$, consisting preferably of india-rubber, so placed, as shown, to be in contact with the closed lids, and thus temporarily seal the joint between them and the case.

$b'$ $b'$ are strips of rubber on the uniting ends of the lids.

C C are filling ports or tubes in the lids B B, and D D are screw-caps on the upper ends of these ports.

E E are metallic straps, turning at their upper ends on headed pins $c$ $c$, projecting from the central part of the lateral edges of the lids B B. In each strap E is a longitudinal slot, $d$, and F F are screw-clamps passing through these slots and into the sides of the case A, as shown. It will now be perceived that if the lids be closed and pressed down they may be held firmly to their seats by tightening the clamps F F. It will also be observed that by loosening the clamps the lids may be arranged in the position indicated in the dotted or broken lines shown in Fig. 3, thus permitting of access to the interior of the case, and that they may be returned to their closed position with facility.

G G are interior removable vessels, made preferably of metal, and into which the cream is to be poured through the ports C C, the caps of which, of course, being first removed. In the drawings I have shown two interior vessels; but one only may be sufficient ordinarily, and only one may be deemed preferable in practice. When two are used I connect them by means of a tubular connection or pipe, e, arranged near the bottoms of each. H is a faucet entering the case A and one of the vessels G G. It will be perceived that the vessels G G stand on legs f f, so varied in height as to tilt or incline the bottoms of the vessels, so that the cream may be all drained out or drawn off through the faucet.

I I are floats in the vessels G G, and g g are central openings therein. I deem it preferable, but not absolutely essential, to make the tops or upper sides of the floats concave, as shown. On the floats are ears h h, to facilitate the lifting of the floats from the vessels containing them, and i i are air-vents covered by screw-caps. These air-vents should be covered when the vessel is in use, but uncovered when the floats are placed in hot water for being cleaned, as otherwise they would then be liable to injury by the expansion of the air in the hollow parts of the floats.

In use, the cream collected is poured in through the ports c c, as before stated, and falls upon the floats, through the central openings of which it passes into the vessels G G. The cream in these vessels, therefore, is prevented from contact with the air, for the floats always lie on the top of the cream therein, rising as the vessel is filled and falling as the cream is drawn off. If at any time the cream should flow out imperfectly through the faucet, owing to suction or a tendency to a vacuum in the case, one of the caps D D may be slightly loosened until the flow becomes sufficient; but it is not probable that the necessity of so doing will arise, as it is not likely that the case, though carefully made to exclude air, will be perfectly air-tight. An automatic air-valve may be employed to overcome imperfect eduction, arising from the cause referred to, and a lamp may then be arranged in the case in very cold weather, the said valve being made sensitive enough to admit sufficient air to supply combustion.

It will now be perceived that the chief purpose I have in view may not only be attained by means of a portable vessel constructed substantially as shown and described, but that I have also disclosed some minor features of construction which may be employed with advantage in cases or vessels of this class.

Having thus described my invention, what I claim as new, and desire to secure by Letters Patent, is—

1. A portable case for transporting cream, consisting of the outer case, A, having double walls and filling, and provided with a double-walled and filled cover adapted to close practically air-tight, provided with ports, and devices for closing said ports, for filling through said covers into the receivers G G without removing said covers, in combination with the receiver or receivers secured inside said case, and connected to a faucet on the outside, and provided with floats adapted to float upon the surface of the cream, said float having an opening practically in line with the port to allow the cream to pass underneath, all substantially as described.

2. A portable case for transporting cream, consisting of the outer case, A, having double walls, between which is a filling, $a'$, and containing in its upper edge a yielding cushion or packing, $b$, one or more double-walled and filled sliding covers, B B, having therein the screw-capped filling-ports C C, one or more receivers, G G, having inclined bottoms, and floats I I, provided with central openings, and the faucet H, entering the case and receiver G, all constructed and arranged substantially as shown and described, and for the purposes specified.

3. The combination of the outer case, A, having along its upper edge a yielding cushion, $b$, one or more covers, B B, the pins or studs $c c$, clamps F F, and the pivoted and slotted straps E E, all substantially as and for the purposes specified.

JOHN G. CHERRY.

Witnesses:
JAMES A. BIXBY,
EARLE F. ANDREWS.